(12) United States Patent
Hughes et al.

(10) Patent No.: US 7,964,093 B2
(45) Date of Patent: Jun. 21, 2011

(54) SELENIUM REMOVAL PROCESS

(75) Inventors: Mark A. Hughes, Bartlesville, OK (US); Roland Schmidt, Bartlesville, OK (US); Jon M. Nelson, Bartlesville, OK (US); Joseph B. Cross, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 12/708,356

(22) Filed: Feb. 18, 2010

(65) Prior Publication Data

US 2010/0213104 A1 Aug. 26, 2010

Related U.S. Application Data

(60) Provisional application No. 61/154,203, filed on Feb. 20, 2009.

(51) Int. Cl.
 *C10G 25/00* (2006.01)
(52) U.S. Cl. ........ 208/299; 208/293; 502/414; 502/415; 502/416; 502/417; 502/430; 210/749; 210/757; 210/763
(58) Field of Classification Search .............. 208/293, 208/299; 502/414–417, 430; 210/749, 757, 210/763
See application file for complete search history.

(56) References Cited

U.S. PATENT DOCUMENTS

| | | | |
|---|---|---|---|
| 5,766,567 A | 6/1998 | Voirin et al. | |
| 7,419,606 B2 | 9/2008 | Johnson et al. | |
| 2005/0214925 A1* | 9/2005 | Chen et al. | 435/266 |
| 2007/0265161 A1* | 11/2007 | Gadkaree et al. | 502/417 |
| 2008/0142446 A1* | 6/2008 | Johnson et al. | 210/660 |
| 2008/0207443 A1 | 8/2008 | Gadkaree et al. | |

FOREIGN PATENT DOCUMENTS

WO 2005042130 5/2005

OTHER PUBLICATIONS

Takefumi Morimoto, et al Characteristics of the Mercury Vapor Removal from Coal Combustion Flue Gas by Activated Carbon Using H2S Fuel 84 (2005) 1968-1974.
Alfredo Wust: "Claus-Verfahren" In: "Rompp Lexikon Online 3.7" Mar. 2006, Georg Thieme Verlag, XP002595371, pp. 1-1.
Anoop Krishnan K; Anirudhan T.S. "Removal of mercury (II) from aqueous solutions and chlor-alkali industry effluent by steam activated and sulphurised activated carbons prepared from bagasse pith:kinetics and equilibrum studies" Journal of Hazardous Materials, vol. 92, No. 2, (Feb. 6, 2002), pp. 161-183, XP002598467 ISSN:0304-3894 DOI: 10.1016/S0304-3894(02)00014-6.
PCT/US2010/024602 International Search Report (Form PCT/ISA/220) dated Sep. 29, 2010.

* cited by examiner

*Primary Examiner* — Glenn A Caldarola
*Assistant Examiner* — Michelle L Stein

(57) ABSTRACT

Methods and apparatus relate to treating fluid to at least reduce selenium content within the fluid, which may be an aqueous liquid and form a feed stream. The treating removes selenium that may be present in compounds, such as selenocyanate, from the feed stream based on adsorption from contact of the fluid with a sorbent. Flowing a gaseous hydrogen sulfide and sulfur dioxide containing stream over a support, such as activated carbon, may provide the sorbent impregnated with sulfur and utilized in the treating of the fluid.

20 Claims, 3 Drawing Sheets

SELENIUM REMOVAL PROCESS

CROSS-REFERENCE TO RELATED APPLICATIONS

None

STATEMENT REGARDING FEDERALLY SPONSORED RESEARCH OR DEVELOPMENT

None

FIELD OF THE INVENTION

Embodiments of the invention relate to treating fluid utilizing a material prepared for removal of selenium-containing compounds from the fluid.

BACKGROUND OF THE INVENTION

Fossil fuels contain naturally occurring selenium, which exists in several oxidation states, including selenide (−2), elemental selenium (0), selenite (+4), and selenate (+6). Refining of oils and processing of coals containing selenium can generate process water with amounts of selenium-containing compounds in excess of limits allowed by governmental standards for discharge of the water into the environment. These aqueous streams often include the selenium in soluble forms, such as selenocyanate (SeCN) in zero oxidative states and selenite ($SeO_3$) and selenate ($SeO_4$) as oxidized species.

Various treatment techniques for the process water add to costs and may not even enable achieving selenium limits. For example, some techniques rely on adsorption. However, sorbent materials previously utilized for treating the process water limit effectiveness and efficiency in such prior adsorption processes.

Therefore, a need exists for improved methods and systems for removal of selenium-containing compounds from a fluid.

SUMMARY OF THE INVENTION

In one embodiment, a method removes selenium from a feed stream. The method includes removing selenium from a feed stream by contacting the feed stream with a sorbent. The sorbent includes a support that has been impregnated with sulfur by reacting hydrogen sulfide and sulfur dioxide in presence of the support.

According to one embodiment, a method of selenium content removal from a feed stream includes heating at least one of the feed stream and a bed packed with a sorbent to a temperature between 60° C. and 80° C. The feed stream is at a pH between 1 and 10 and contains at least 10 parts per billion (ppb) of a compound selected from at least one of selenocyanate, selenite, and selenate. The method further includes removing selenium from the feed stream by contacting the feed stream with the sorbent comprising a carbon support that has been impregnated with sulfur by reacting hydrogen sulfide and sulfur dioxide in presence of the support.

For one embodiment, a method includes removing selenium from a feed stream by contacting the feed stream with a sorbent comprising a carbon support. The carbon support has been impregnated with between 1% and 40% sulfur by weight. Such impregnation is by flowing a gaseous hydrogen sulfide and sulfur dioxide containing stream over the carbon support at a temperature between 100° C. and 1000° C.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Embodiments of the invention relate to treating fluid to at least reduce selenium content within the fluid, which may be an aqueous liquid from a petroleum refinery, a power plant, irrigation runoff, or industrial waste, for example. As used herein, "selenium" refers to selenium within or from compounds, such as selenocyanate, selenite, selenate, hydrogen selenide, and combinations thereof, containing selenium and at least one other element and/or elemental selenium. Concentration of the selenium thus provides the selenium content within the fluid. The treating removes the selenium content from a feed stream of the fluid based on adsorption from contact of the fluid with a sorbent. In one embodiment, flowing a gaseous hydrogen sulfide and sulfur dioxide containing stream over a support, such as activated carbon, provides the sorbent impregnated with sulfur and utilized in the treating of the fluid.

Figure 1:
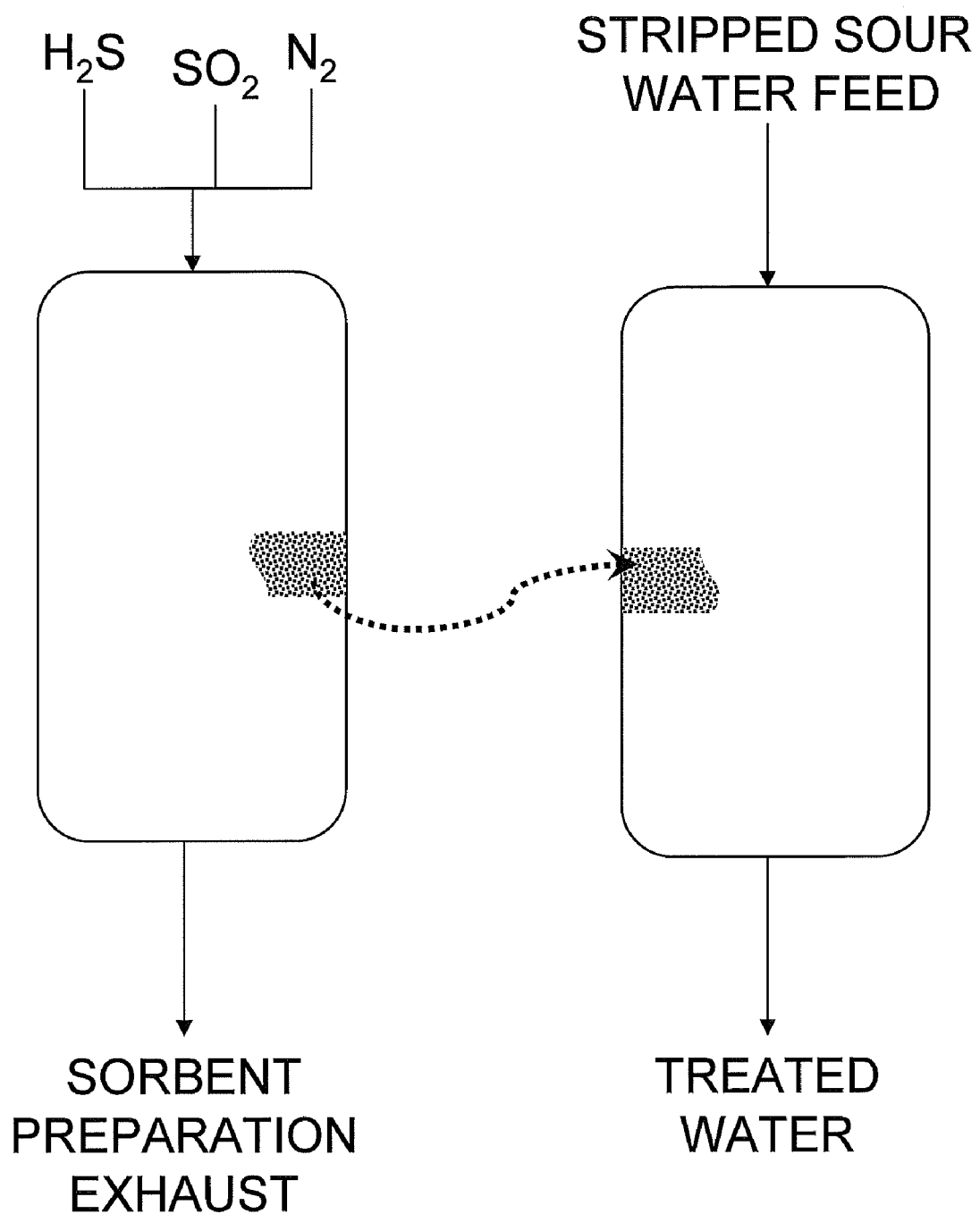
FIG. 1 is a schematic process diagram illustrating treatment of fluid utilizing a sorbent prepared for selenium removal from the fluid, according to embodiments of the invention.

FIG. 1 shows a schematic process diagram illustrating various steps and aspects associated with one embodiment for treatment of a feed stream 100 to provide a treated stream 102. The treatment removes selenium from the feed stream 100. The treated stream 102 thereby contains less selenium content, on an elemental basis, than the feed stream 100.

The process includes preparing a support 104 in a sorbent preparation bed 106 to produce a sorbent 108 impregnated with sulfur. As indicated by dashed line 112, the support 104 once prepared in the sorbent preparation bed 106 supplies the sorbent 108 packed into a treatment bed 110. In operation, the feed stream 100 passes through the treatment bed 110 in contact with the sorbent 108 located between an inlet for the feed stream 100 and an outlet for the treated stream 102.

With respect to preparing the support 104, a gaseous mixture including hydrogen sulfide ($H_2S$) and sulfur dioxide ($SO_2$) passes over the support 104 at a temperature above 100° C., such as between 100° C. and 1000° C. Examples of base material for the support 104 include activated or porous carbon, alumina ($Al_2O_3$), silica ($SiO_2$), and combinations thereof. For some embodiments, the gaseous mixture contains the hydrogen sulfide and sulfur dioxide in a $H_2S$ to $SO_2$ molar ratio of about 2:1. Further, the gaseous mixture may include an inert diluent such as nitrogen ($N_2$). Respective first, second and third supplies 114, 116, 118 for the hydrogen sulfide, the sulfur dioxide, and the nitrogen introduce the gaseous mixture into the sorbent preparation bed 106 where the gaseous mixture contacts the support 104. An exhaust 120 from the sorbent preparation bed 106 permits continuous flow of the gaseous mixture for a desired contact time between the gaseous mixture and the support 104.

While inside the sorbent preparation bed 106, the sulfur dioxide and the hydrogen sulfide react to produce sulfur (S) and water ($H_2O$). The sulfur from this reaction deposits on the support 104. Percentage of sulfur loading of the support 104 ranges in some embodiments from 1.0% to 40.0% by weight and depends on mass of the support 104 (e.g., 0.001 kilograms (kg) to 1000 kg), length of the contact time (e.g., 0.1 hours to 1000 hours), and concentration of the sulfur dioxide and the hydrogen sulfide in the gaseous mixture.

The support 104 once loaded with the sulfur to a selected weight percentage provides the sorbent 108 impregnated with sulfur. The sorbent 108 formed as described herein displays affinity for selenium removal from aqueous solutions. A flow path for the feed stream 100 contacts the sorbent 108 that is packed within the treatment bed 110. The sorbent 108 adsorbs the elemental selenium and/or selenium-containing compounds within the feed stream 100 such that effluent from the treatment bed 110 provides the treated stream 102 of water suitable for discharge into the environment.

In some embodiments, adjusting the pH of the feed stream 100 to between 1.0 and 10.0 or between 2.0 and 5.0 facilitates adsorption. Adding to the feed stream 100 an acid selected from, for example, at least one of sulfuric acid ($H_2SO_4$), tin(II) chloride ($SnCl_2$), iron(II) chloride ($FeCl_2$), and aluminum chloride ($AlCl_3$) prior to contacting the feed stream 100 with the sorbent 108 can lower pH of the feed stream 100 that has an initial pH more basic than desired. Further, heating the feed stream 100 and/or the treatment bed to between 1° C. and 100° C. or between 60° C. and 80° C. may aid in the adsorption. Hydraulic flux of the feed stream 100 through the treatment bed 110 may vary from 0.1 to 1000 gallons per minute per foot squared ($GPM/ft^2$) or from 2 to 4 $GPM/ft^2$.

On an elemental selenium basis, the feed stream 100 may contain at least 10 parts per billion (ppb) or at least 1.0 parts per million (ppm) of the elemental selenium and/or the compounds that contain selenium and contain at least one other element. Stripped sour water may make up the feed stream 100, which thus may contain other constituents, such as thiosulfate, chloride, phenolics, sulfate, organics, and combinations thereof, in addition to water and selenium-containing compounds. For some embodiments, the feed stream 100 contacts a sufficient quantity of the sorbent 108 such that the treated stream 102 contains at least 40% by weight less of the selenium content from compounds containing selenium and at least one other element and/or the elemental selenium than the feed stream 100.

One advantageous benefit of the foregoing relates to availability of the first supply 114 for the hydrogen sulfide and the second supply 116 for the sulfur dioxide. While other sources of sulfur may not be produced onsite or provide efficient utilization of onsite resources, refineries and power plants, for example, generate the hydrogen sulfide in other processes. Partial combustion of the hydrogen sulfide generated may produce the sulfur dioxide.

Figure 2:
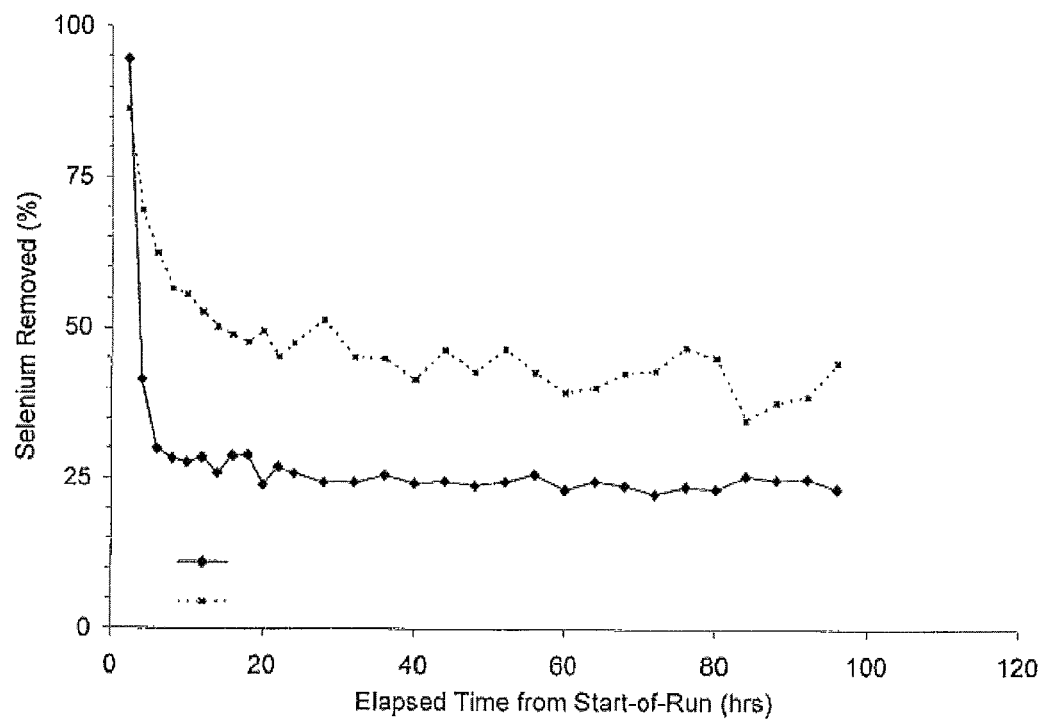
FIG. 2 is a graph with plots of percentage selenium removal as a function of time for comparison of a prior process to a method according to embodiments of the invention.
Figure 3:
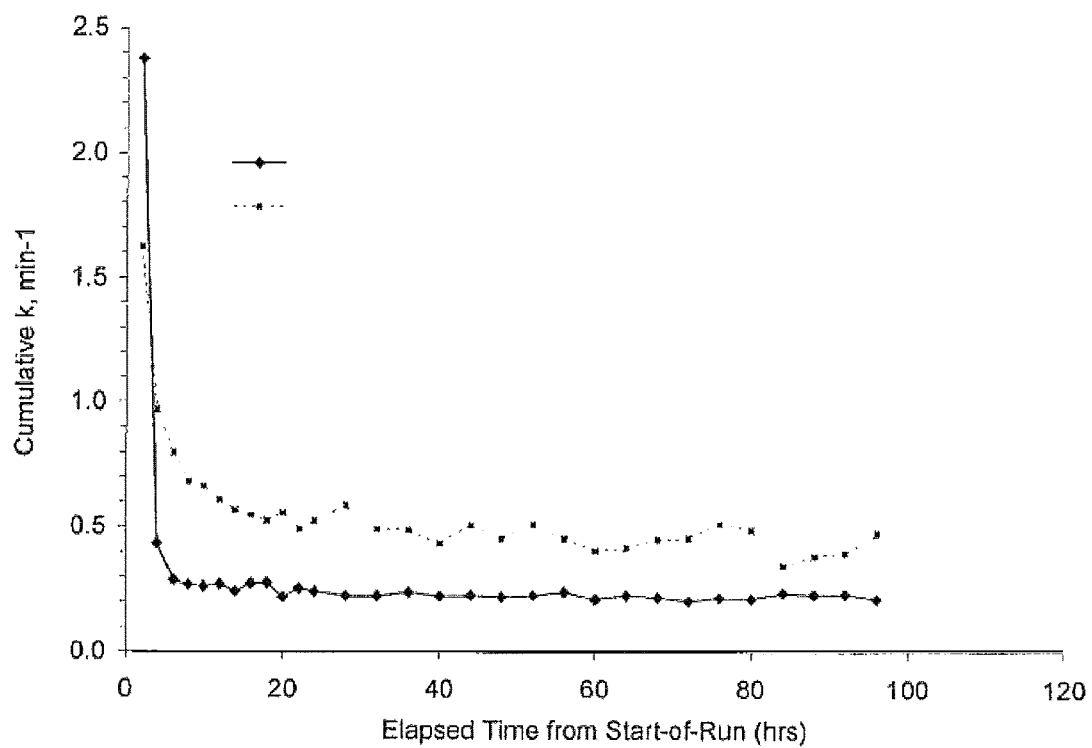
FIG. 3 is a graph with plots of first order rate constants as a function of time for comparison of the prior process to the method according to embodiments of the invention.

The sorbent 108 prepared as described herein provides unexpected results as set forth in the Example 1 and illustrated in FIGS. 2 and 3. While not limited to any particular phenomena, it is believed that the sorbent 108 is impregnated with allotropes of sulfur more active for selenium removal when loaded with sulfur by the reaction between the hydrogen sulfide and the sulfur dioxide within the gaseous mixture than if loaded with other sulfur sources such as solid sulfur or if loaded with sulfur-containing compounds without reaction to produce elemental sulfur. As a result of this increased activity, the sorbent 108 requires no separate activation. The feed stream 100 passes over the sorbent 108 without addition of any other activating agents to the treatment bed 110, for some embodiments. During loading of sulfur on the support 104 to prepare the sorbent 108, the gaseous mixture enters pores of the support 104. The hydrogen sulfide and the sulfur dioxide within the gaseous mixture reacts while disposed in the pores of the support 104, which may thereby catalyze the reaction creating the sulfur that impregnates the sorbent 108. Compared to solid sulfur used for impregnation, the gaseous mixture is able to disperse more into the pores of the support 104 resulting in more even distribution of the sulfur upon creation of the sorbent 108 impregnated with the sulfur.

Example 1

A 2.0 gram (g) bed of activated carbon having a particle size of about 0.9 millimeters (mm) was heated to 100° C. while a flow of nitrogen passed through the bed. A gaseous stream containing 5% hydrogen sulfide in nitrogen flowing at 18 milliliters per minute (mL/min) was combined with a gaseous stream containing 1% sulfur dioxide in nitrogen flowing at 45 mL/min and a 100% nitrogen stream flowing at 240 mL/min to produce a gaseous mixture. The gaseous mixture was passed over the activated carbon at a temperature of 550° C. for three hours. Next, the activated carbon was cooled to about 25° C. while maintaining the flow of the gaseous mixture. The activated carbon had 10.4% sulfur by weight as a result of being contacted with the gaseous mixture and was used as an exemplary sorbent for subsequent treatment of a simulated stripped sour water solution.

The exemplary sorbent was packed into a treatment bed that was 150 mm long and 10 mm in diameter. For comparison, the sour water solution was also passed through another same sized treatment bed packed with a comparative sorbent. The comparative sorbent, known as MERSORB®-LW, was a carbon material impregnated with 13% sulfur by weight.

The stripped sour water solution was pH adjusted to about 2.5 using 0.1 molar sulfuric acid. The temperature of the treatment beds was about 68° C. The stripped sour water solution was fed through the treatment beds at a velocity of 3.0 $GPM/ft^2$ during first and second treatment runs respectively utilizing the exemplary sorbent and the comparative sorbent. Each of the treatment runs lasted about one hundred hours. Table 1 lists initial constituents within water of the sour water solution prior to conducting the treatment runs.

TABLE 1

| | |
|---|---|
| Sodium | 15 ppm |
| Calcium | 1.5 ppm |
| Ammonium | 293 ppm |
| Chloride | 10 ppm |
| Sulfate | 560 ppm |
| Sulfite | 0.6 ppm |
| Thiosulfate | 35 ppm |
| Thiocyanate | 37 ppm |
| Acetate | 128 ppm |
| Propionate | 89 ppm |
| Butyrate | 36 ppm |
| Total organic carbon (organic acids + phenolics) | 444 ppm |
| Phenolics | 329 ppm |
| Selenium (in form of selenocyanate) | 1.85 ppm |

FIG. 2 shows percentage selenium removal results for the first and second treatment runs plotted as a function of time.

A first removal curve 200 corresponds to the first treatment run utilizing the exemplary sorbent. As represented by the first removal curve 200, the exemplary sorbent removed about 40% of selenium content from the sour water solution throughout the first treatment run after having removed higher percentages of the selenium content during an initial period of less than twenty hours. Effluents from the first treatment run utilizing the exemplary sorbent contained less than 1.0 ppm selenium. However, the comparative sorbent only removed, as indicated by a second removal curve 202, about 25% of the selenium content from the sour water solution during a time interval corresponding to when the exemplary sorbent removed about 40% or more of the selenium content from the sour water solution. This difference in percentages of selenium removal depicted by the first and second removal curves 200, 202 demonstrates the unexpected superior results obtained by contacting the sour water solution with the exemplary sorbent that is impregnated with sulfur and formed by reacting hydrogen sulfide and sulfur dioxide compared to when the sour water solution is contacted with other sorbents including differently prepared sulfur impregnated carbons.

Foregoing data for amount of selenium removal provided relative comparisons for particular parameters as set forth with respect to Example 1 even though the amount of removal depends on factors such as bed length and amount of sorbent in the bed. Quantity of selenium content in the effluent is a function of bed length for any selenium bearing solution under a given set of process conditions. Therefore, increasing the bed length can provide greater than 40% removal of the selenium content from the sour water solution.

FIG. 3 plots first order rate constants for rate of selenium removal as a function of time with respect to the first and second treatment runs. A first rate curve 300 plots the rate constant for the exemplary sorbent. At almost half the rate constant shown by the first curve 300, the second rate curve 302 plots the rate constant for the comparative sorbent. Therefore, utilizing the exemplary sorbent enables removing a given amount of selenium content with a shorter bed and/or shorter residence time relative to utilizing the comparative sorbent.

Example 2

Figure 4:
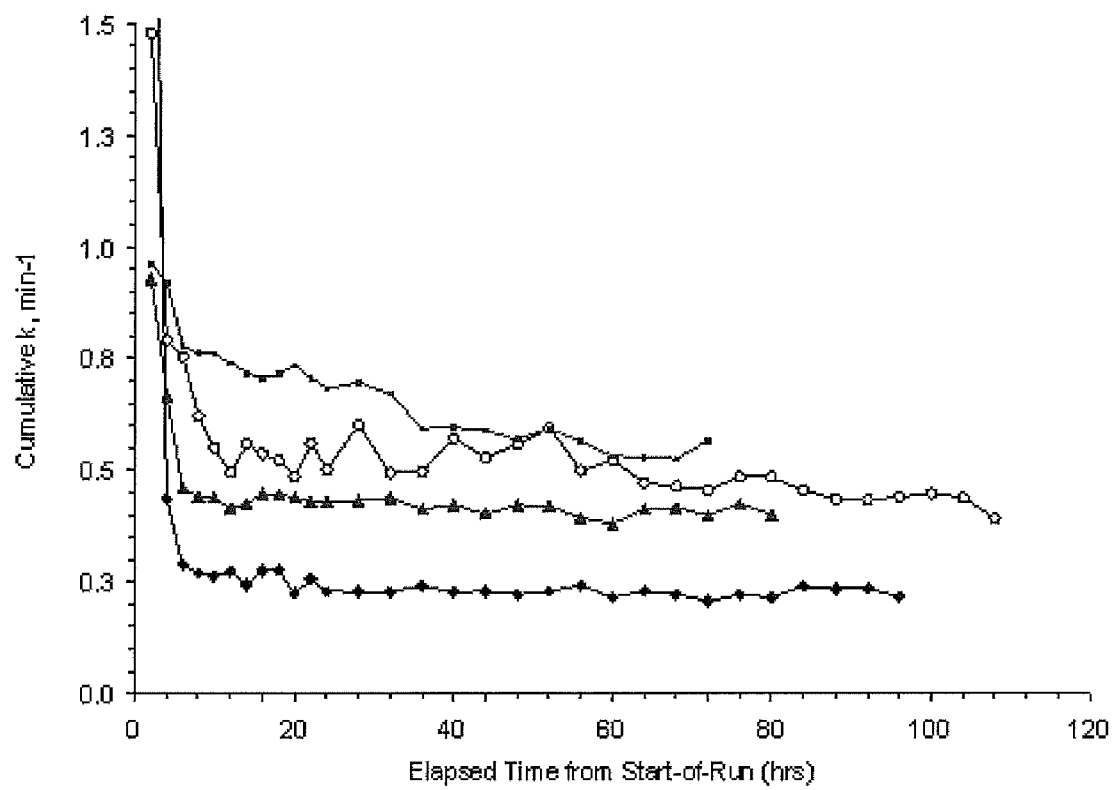
FIG. 4 is a graph with plots of first order rate constants as a function of time for comparison of the prior process to three additional methods according to embodiments of the invention.

A 10 g bed of activated carbon was heated to 100° C. while a flow of nitrogen passed through the bed. A gaseous stream containing 5% $H_2S$ in $N_2$ at 18 mL/min was combined with a gaseous stream containing 1% $SO_2$ in $N_2$ at 45 mL/min and a 100% $N_2$ stream flowing at 240 mL/min to produce a gaseous mixture. The gaseous mixture was passed over the bed of activated carbon at a temperature of 500° C. for 3 hours 45 minutes. The material was cooled to room temperature while maintaining the $H_2S$, $SO_2$ and $N_2$ flow. The activated carbon had 4.9% sulfur by weight as a result of being contacted with the gaseous mixture and was used as a second exemplary sorbent for subsequent treatment of a simulated stripped sour water solution as described with respect to Example 1. As shown by a second example rate curve 402 in FIG. 4 that corresponds to a higher rate of selenium removal than the second rate curve 302 for the comparative sorbent, this second exemplary sorbent removes 99% of selenium in less time than the comparative sorbent.

Example 3

A 6 g bed of activated carbon was heated to 100° C. while a flow of nitrogen passed through the bed. A gaseous stream containing 5% $H_2S$ in $N_2$ at 108 mL/min was combined with a gaseous stream containing 1% $SO_2$ in $N_2$ at 270 mL/min to produce a gaseous mixture. The gaseous mixture was passed over the bed of activated carbon at a temperature of 400° C. for 1 hour 30 minutes. The material was cooled to room temperature while maintaining the $H_2S$, $SO_2$ and $N_2$ flow. The activated carbon had 15.8% sulfur by weight as a result of being contacted with the gaseous mixture and was used as a third exemplary sorbent for subsequent treatment of a simulated stripped sour water solution as described with respect to Example 1. As shown by a third example rate curve 403 in FIG. 4 that corresponds to a higher rate of selenium removal than the second rate curve 302 for the comparative sorbent, this third exemplary sorbent removes 99% of selenium in less time than the comparative sorbent.

Example 4

A 6 g bed of activated carbon was heated to 100° C. while a flow of nitrogen passed through the bed. A gaseous stream containing 5% $H_2S$ in $N_2$ at 162 mL/min was combined with a gaseous stream containing 1% $SO_2$ in $N_2$ at 405 mL/min to produce a gaseous mixture. The gaseous mixture was passed over the bed of activated carbon at a temperature of 500° C. for 1 hour. The material was cooled to room temperature while maintaining the $H_2S$, $SO_2$ and $N_2$ flow. The activated carbon had 20.4% sulfur by weight as a result of being contacted with the gaseous mixture and was used as a fourth exemplary sorbent for subsequent treatment of a simulated stripped sour water solution as described with respect to Example 1. As shown by a fourth example rate curve 404 in FIG. 4 that corresponds to a higher rate of selenium removal than the second rate curve 302 for the comparative sorbent, this fourth exemplary sorbent removes 99% of selenium in less time than the comparative sorbent.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A method comprising the step of:
   removing selenium from a feed stream by contacting the feed stream with a sorbent comprising a support that has been impregnated with sulfur by reacting hydrogen sulfide and sulfur dioxide in presence of the support.

2. The method according to claim 1, wherein the support comprises activated carbon.

3. The method according to claim 1, wherein the support comprises alumina.

4. The method according to claim 1, wherein the feed stream contains selenocyanate as source of the selenium that is removed.

5. The method according to claim 1, further comprising passing a gaseous mixture of the hydrogen sulfide, the sulfur dioxide and an inert diluent in contact with the support to conduct the reacting of the hydrogen sulfide and the sulfur dioxide.

6. The method according to claim 1, further comprising passing a gaseous mixture in contact with the support to conduct the reacting, wherein the gaseous mixture contains the hydrogen sulfide and the sulfur dioxide in a $H_2S$ to $SO_2$ molar ratio of about 2:1.

7. The method according to claim 1, further comprising flowing a gaseous mixture of the hydrogen sulfide, the sulfur dioxide and nitrogen over the support at a temperature between 100° C. and 1000° C. to impregnate the support with between 1% and 40% sulfur by weight.

8. The method according to claim 1, wherein the removing provides a treated stream that has selenium concentration at least 40% lower than the feed stream.

9. The method according to claim 1, wherein the feed stream is aqueous liquid.

10. The method according to claim 1, wherein the sorbent is impregnated with between 1% and 40% sulfur by weight as a result of flowing a gaseous hydrogen sulfide and sulfur dioxide containing stream over the support at a temperature between 100° C. and 1000° C.

11. The method according to claim 1, further comprising heating at least one of the feed stream and a bed packed with the sorbent to a temperature between 60° C. and 80° C., wherein the feed stream is at a pH between 1 and 10 and contains at least 10 parts per billion (ppb) of a compound containing the selenium that is removed and selected from at least one of selenocyanate, selenite, and selenate.

12. A method comprising the steps of:
heating at least one of a feed stream and a bed packed with a sorbent to a temperature between 60° C. and 80° C., wherein the feed stream is at a pH between 1 and 10 and contains at least 10 parts per billion (ppb) of a compound containing selenium and selected from at least one of selenocyanate, selenite, and selenate; and
removing the selenium from the feed stream by contacting the feed stream with the sorbent comprising a carbon support that has been impregnated with sulfur by reacting hydrogen sulfide and sulfur dioxide in presence of the support.

13. The method according to claim 12, further comprising flowing a gaseous hydrogen sulfide and sulfur dioxide containing stream over the carbon support at a temperature between 100° C. and 1000° C. to form the sorbent impregnated with between 1% and 40% sulfur by weight.

14. The method according to claim 12, further comprising passing a gaseous mixture with the hydrogen sulfide and the sulfur dioxide in contact with the carbon support to create the reaction.

15. The method according to claim 12, wherein the compound comprises selenocyanate.

16. The method according to claim 12, wherein the support removes selenium content from the feed stream in order to provide the treated stream with a selenium concentration at least 40% lower than the feed stream.

17. A method comprising the steps of:
removing selenium from a feed stream by contacting the feed stream with a sorbent comprising a carbon support that has been impregnated with between 1% and 40% sulfur by weight by flowing a gaseous hydrogen sulfide and sulfur dioxide containing stream over the carbon support at a temperature between 100° C. and 1000° C.

18. The method according to claim 17, further comprising heating at least one of the feed stream and a bed packed with the sorbent to a temperature between 60° C. and 80° C., wherein the feed stream is at a pH between 1 and 10 and contains at least 10 parts per billion (ppb) of the compound.

19. The method according to claim 17, wherein the gaseous hydrogen sulfide and sulfur dioxide containing stream contains a $H_2S$ to $SO_2$ molar ratio of about 2:1.

20. The method according to claim 17, wherein the feed stream is aqueous liquid.

* * * * *